United States Patent
Sheridan et al.

(10) Patent No.: US 11,448,310 B2
(45) Date of Patent: Sep. 20, 2022

(54) OIL BAFFLE FOR GAS TURBINE FAN DRIVE GEAR SYSTEM

(71) Applicant: RAYTHEON TECHNOLOGIES CORPORATION, Farmington, CT (US)

(72) Inventors: William G. Sheridan, Southington, CT (US); Michael E. McCune, Colchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/365,220

(22) Filed: Jul. 1, 2021

(65) Prior Publication Data

US 2021/0341049 A1    Nov. 4, 2021

Related U.S. Application Data

(60) Continuation of application No. 16/833,754, filed on Mar. 30, 2020, now Pat. No. 11,079,007, which is a
(Continued)

(51) Int. Cl.
*F16H 57/04*    (2010.01)
*F02C 7/36*    (2006.01)
(Continued)

(52) U.S. Cl.
CPC ......... *F16H 57/0427* (2013.01); *F01D 25/18* (2013.01); *F02C 3/04* (2013.01);
(Continued)

(58) Field of Classification Search
CPC .... F02C 7/36; F16H 57/0421–57/0486; F05D 2230/60
See application file for complete search history.

(56) References Cited

U.S. PATENT DOCUMENTS 2,258,792 A    10/1941   New
2,591,743 A    4/1952   Thompson
(Continued)

FOREIGN PATENT DOCUMENTS

DE    3410977 A1    9/1985
EP    0791383 A1    8/1997
(Continued)

OTHER PUBLICATIONS

2003 NASA seal/secondary air system workshop. (2003). NASA/CP-2004-212963/vol. 1. Sep. 1, 2004. pp. 1-408.
(Continued)

*Primary Examiner* — Ernesto A Suarez
*Assistant Examiner* — Lillian T Nguyen
(74) *Attorney, Agent, or Firm* — Carlson, Gaskey & Olds, P.C.

(57) ABSTRACT

A method of assembling an epicyclic gear train includes positioning a carrier, the carrier being a unitary structure with side walls and mounts unitary with one another, inserting intermediate gears through a central opening of the carrier, moving each of the intermediate gears into intermediate gear pockets, inserting baffles into the carrier, inserting a sun gear through the central opening, and moving the intermediate gears to intermesh with the sun gear, and moving a ring gear into engagement with the intermediate gears.

30 Claims, 5 Drawing Sheets

Related U.S. Application Data continuation of application No. 15/808,613, filed on Nov. 9, 2017, now Pat. No. 10,605,351, which is a continuation of application No. 14/485,039, filed on Sep. 12, 2014, now Pat. No. 9,874,274, which is a continuation of application No. 13/861,602, filed on Apr. 12, 2013, now Pat. No. 8,898,900, which is a continuation of application No. 13/346,790, filed on Jan. 10, 2012, now Pat. No. 8,640,336, which is a continuation of application No. 12/718,436, filed on Mar. 5, 2010, now Pat. No. 8,276,275, which is a division of application No. 11/481,112, filed on Jul. 5, 2006, now Pat. No. 7,704,178.

(51) Int. Cl.
*F01D 25/18* (2006.01)
*F02C 3/04* (2006.01)
*F16H 57/08* (2006.01)

(52) U.S. Cl.
CPC ............ *F02C 7/36* (2013.01); *F16H 57/046* (2013.01); *F16H 57/0421* (2013.01); *F16H 57/0423* (2013.01); *F16H 57/0479* (2013.01); *F16H 57/0482* (2013.01); *F05D 2230/60* (2013.01); *F05D 2260/40311* (2013.01); *F05D 2260/98* (2013.01); *F16H 57/0486* (2013.01); *F16H 57/082* (2013.01); *Y10T 29/4932* (2015.01); *Y10T 29/49316* (2015.01); *Y10T 29/49323* (2015.01); *Y10T 29/49464* (2015.01)

(56) References Cited

U.S. PATENT DOCUMENTS

| | | | |
|---|---|---|---|
| 2,936,655 A | 5/1960 | Peterson et al. | |
| 3,021,731 A | 2/1962 | Stoeckicht | |
| 3,194,487 A | 7/1965 | Tyler et al. | |
| 3,287,906 A | 11/1966 | McCormick | |
| 3,352,178 A | 11/1967 | Lindgren et al. | |
| 3,412,560 A | 11/1968 | Gaubatz | |
| 3,527,121 A | 9/1970 | Moore et al. | |
| 3,650,353 A | 3/1972 | Abbott | |
| 3,664,612 A | 5/1972 | Skidmore et al. | |
| 3,747,343 A | 7/1973 | Rosen | |
| 3,754,484 A | 8/1973 | Roberts | |
| 3,765,623 A | 10/1973 | Donelson et al. | |
| 3,820,719 A | 6/1974 | Clark et al. | |
| 3,843,277 A | 10/1974 | Ehrich | |
| 3,853,432 A | 12/1974 | Cronstedt | |
| 3,892,358 A | 7/1975 | Gisslen | |
| 3,932,058 A | 1/1976 | Harner et al. | |
| 3,935,558 A | 1/1976 | Miller et al. | |
| 3,988,889 A | 11/1976 | Chamay et al. | |
| 4,130,872 A | 12/1978 | Haloff | |
| 4,220,171 A | 9/1980 | Ruehr et al. | |
| 4,240,250 A | 12/1980 | Harris | |
| 4,271,928 A | 6/1981 | Northern | |
| 4,284,174 A | 8/1981 | Salvana et al. | |
| 4,289,360 A | 9/1981 | Zirin | |
| 4,378,711 A | 4/1983 | Daniel | |
| 4,478,551 A | 10/1984 | Honeycutt, Jr. et al. | |
| 4,649,114 A | 3/1987 | Miltenburger et al. | |
| 4,696,156 A | 9/1987 | Burr et al. | |
| 4,722,357 A | 2/1988 | Wynosky | |
| 4,827,712 A | 5/1989 | Coplin | |
| 4,914,904 A | 4/1990 | Parnes et al. | |
| 4,979,362 A | 12/1990 | Vershure, Jr. | |
| 5,058,617 A | 10/1991 | Stockman et al. | |
| 5,102,379 A | 4/1992 | Pagluica et al. | |
| 5,141,400 A | 8/1992 | Murphy et al. | |
| 5,317,877 A | 6/1994 | Stuart | |
| 5,361,580 A | 11/1994 | Ciokajlo et al. | |
| 5,391,125 A | 2/1995 | Turra et al. | |
| 5,433,674 A | 7/1995 | Sheridan et al. | |
| 5,447,411 A | 9/1995 | Curley et al. | |
| 5,466,198 A | 11/1995 | McKibbin et al. | |
| 5,472,383 A | 12/1995 | McKibbin | |
| 5,524,847 A | 6/1996 | Brodell et al. | |
| 5,634,767 A | 6/1997 | Dawson | |
| 5,677,060 A | 10/1997 | Terentieva et al. | |
| 5,778,659 A | 7/1998 | Duesler et al. | |
| 5,857,836 A | 1/1999 | Stickler et al. | |
| 5,915,917 A | 6/1999 | Eveker et al. | |
| 5,975,841 A | 11/1999 | Lindemuth et al. | |
| 5,985,470 A | 11/1999 | Spitsberg et al. | |
| 6,158,210 A | 12/2000 | Orlando | |
| 6,223,616 B1 * | 5/2001 | Sheridan | F16H 1/2827 184/6.12 |
| 6,315,815 B1 | 11/2001 | Spadaccini et al. | |
| 6,318,070 B1 | 11/2001 | Rey et al. | |
| 6,387,456 B1 | 5/2002 | Eaton, Jr. et al. | |
| 6,422,791 B1 | 7/2002 | Pallini, Jr. et al. | |
| 6,517,341 B1 | 2/2003 | Brun et al. | |
| 6,607,165 B1 | 8/2003 | Manteiga et al. | |
| 6,709,492 B1 | 3/2004 | Spadaccini et al. | |
| 6,814,541 B2 | 11/2004 | Evans et al. | |
| 6,883,303 B1 | 4/2005 | Seda | |
| 6,905,303 B2 | 6/2005 | Liu et al. | |
| 7,011,599 B2 | 3/2006 | Becquerelle et al. | |
| 7,021,042 B2 | 4/2006 | Law | |
| 7,033,301 B2 | 4/2006 | Kimes | |
| 7,104,918 B2 | 9/2006 | Mitrovic | |
| 7,112,157 B2 | 9/2006 | Uebbing | |
| 7,214,160 B2 | 5/2007 | Illerhaus | |
| 7,219,490 B2 | 5/2007 | Dev | |
| 7,328,580 B2 | 2/2008 | Lee et al. | |
| 7,338,404 B2 | 3/2008 | Gassmann et al. | |
| 7,374,403 B2 | 5/2008 | Decker et al. | |
| 7,442,143 B2 | 10/2008 | Gassmann et al. | |
| 7,490,460 B2 | 2/2009 | Moniz et al. | |
| 7,591,754 B2 | 9/2009 | Duong et al. | |
| 7,632,064 B2 | 12/2009 | Somanath et al. | |
| 7,662,059 B2 | 2/2010 | McCune | |
| 7,704,178 B2 | 4/2010 | Sheridan et al. | |
| 7,806,651 B2 | 10/2010 | Kennepohl et al. | |
| 7,824,305 B2 | 11/2010 | Duong et al. | |
| 7,828,682 B2 | 11/2010 | Smook | |
| 7,883,439 B2 | 2/2011 | Sheridan et al. | |
| 7,926,260 B2 | 4/2011 | Sheridan et al. | |
| 7,997,868 B1 | 8/2011 | Liang | |
| 8,172,717 B2 | 5/2012 | Lopez et al. | |
| 8,202,772 B2 | 6/2012 | Sheridan et al. | |
| 8,204,453 B2 | 6/2012 | Dietrich | |
| 8,205,432 B2 | 6/2012 | Sheridan | |
| 8,276,275 B2 | 10/2012 | Sheridan et al. | |
| 8,640,336 B2 | 2/2014 | Sheridan et al. | |
| 8,667,688 B2 | 3/2014 | McCune et al. | |
| 8,747,272 B2 | 6/2014 | Imai et al. | |
| 8,753,243 B2 | 6/2014 | McCune et al. | |
| 8,763,251 B2 | 7/2014 | McCune et al. | |
| 8,898,900 B2 | 12/2014 | Sheridan et al. | |
| 9,874,150 B2 | 1/2018 | McCune et al. | |
| 9,874,274 B2 | 1/2018 | Sheridan et al. | |
| 2004/0259679 A1 | 12/2004 | Becquerelle et al. | |
| 2005/0026744 A1 | 2/2005 | Illerhaus | |
| 2006/0228206 A1 | 10/2006 | Decker et al. | |
| 2008/0003096 A1 | 1/2008 | Kohli et al. | |
| 2008/0116009 A1 | 5/2008 | Sheridan et al. | |
| 2008/0317588 A1 | 12/2008 | Grabowski et al. | |
| 2009/0056343 A1 | 3/2009 | Suciu et al. | |
| 2009/0111639 A1 | 4/2009 | Klingels | |
| 2009/0304518 A1 | 12/2009 | Kodama et al. | |
| 2009/0314881 A1 | 12/2009 | Suciu et al. | |
| 2010/0035719 A1 | 2/2010 | Wang | |
| 2010/0105516 A1 | 4/2010 | Sheridan et al. | |
| 2010/0148396 A1 | 6/2010 | Xie et al. | |
| 2010/0150702 A1 | 6/2010 | Sheridan et al. | |
| 2010/0212281 A1 | 8/2010 | Sheridan | |
| 2010/0218483 A1 | 9/2010 | Smith | |
| 2010/0261571 A1 | 10/2010 | Matsuoka et al. | |
| 2010/0331139 A1 | 12/2010 | McCune | |
| 2011/0159797 A1 | 6/2011 | Beltman et al. | |

(56) References Cited

U.S. PATENT DOCUMENTS

| | | | |
|---|---|---|---|
| 2011/0293423 | A1 | 12/2011 | Bunker et al. |
| 2012/0124964 | A1 | 5/2012 | Hasel et al. |
| 2013/0102432 | A1 | 4/2013 | Imai et al. |
| 2014/0045645 | A1 | 2/2014 | McCune et al. |

FOREIGN PATENT DOCUMENTS

| | | | |
|---|---|---|---|
| EP | 1142850 A1 | 10/2001 | |
| EP | 1482210 A2 | 12/2004 | |
| EP | 1783344 A1 | 5/2007 | |
| EP | 1876338 A2 | 1/2008 | |
| EP | 1783344 B1 | 12/2009 | |
| EP | 2559913 A1 | 2/2013 | |
| GB | 1516041 A | 6/1978 | |
| GB | 2041090 A | 9/1980 | |
| GB | 2426792 A | 12/2006 | |
| JP | H061889 A | 1/1994 | |
| JP | H061889 U | 1/1994 | |
| JP | 2001208146 A | 8/2001 | |
| JP | 2005163666 A | 6/2005 | |
| JP | 2005207472 A | 8/2005 | |
| WO | 2007038674 A1 | 4/2007 | |
| WO | 2007054066 A1 | 5/2007 | |
| WO | 2012098108 A1 | 7/2012 | |

OTHER PUBLICATIONS

About GasTurb. Retrieved Jun. 26, 2018 from: http://gasturb.de/about-gasturb.html.

Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.

Aerospace Information Report. (2008). Advanced ducted propulsor in-flight thrust determination. SAE International AIR5450. Aug. 2008. p. 1-392.

Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.

AGMA Standard (1997). Design and selection of components for enclosed gear drives. Iexandria, VA: American Gear Manufacturers Association. pp. 1-48.

AGMA Standard (1999). Flexible couplings—Mass elastic properties and other characteristics. Alexandria, VA: American Gear Manufacturers Association. pp. 1-46.

AGMA Standard (2006). Design manual for enclosed epicyclic gear drives. Alexandria, VA: American Gear Manufacturers Association. pp. 1-104.

Ahmad, F. and Mizramoghadam, A.V. (1999). Single v. two stage high pressure turbine design of modern aero engines. ASME. Prestend at the International Gast Turbine & Aeroengine Congress & Exhibition. Indianapolis, Indiana. Jun. 7-10, 1999. pp. 1-9.

Amezketa, M., Iriarte, X., Ros, J., and Pintor, J. (2009). Dynamic model of a helical gear pair with backlash and angle-varying mesh stiffness. Multibody Dynamics 2009, ECCOMAS Thematic Conference. 2009. pp. 1-36.

Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.

Anderson, R.D. (1985). Advanced Propfan Engine Technology {APET} definition study, single and counter-rotation gearbox/pitch change mechanism design. NASA CR-168115. Jul. 1, 1985 pp. 1-289.

Avco Lycoming Divison. ALF 502L Maintenance Manual. Apr. 1981. pp. 1-118.

Aviadvigatel D-110. Jane's Aero-engines, Aero-engines—Turbofan. Jun. 1, 2010.

Awker, R.W. (1986). Evaluation of propfan propulsion applied to general aviation. NASA CR-175020. Mar. 1, 1986. pp. 1-140.

Baker, R.W. (2000). Membrane technology and applications. New York, NY: McGraw-Hill. pp. 87-153.

Berton, J.J. and Guynn, M.D. (2012). Multi-objective optimization of a turbofan for an advanced, single-aisle transport. NASA/TM-2012-217428. pp. 1-26.

Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.

Bloomer, H.E. and Loeffler, I.J. (1982). QCSEE over-the-wing engine acoustic data. NASA-TM-82708. May 1, 1982. pp. 1-558.

Bloomer, H.E. and Samanich, N.E. (1982). QCSEE under-the-wing engine acoustic data. NASA-TM-82691. May 1, 1982. pp 1-28.

Bloomer, H.E. and Samanich, N.E. (1982). QCSEE under-the-wing enging-wing-flap aerodynamic profile characteristics. NASA-TM-82890. Sep. 1, 1982. pp. 1-48.

Bloomer, H.E., Loeffler, I.J., Kreim, W.J., and Coats, J.W. (1981). Comparison of NASA and contractor reslts from aeroacoustic tests of QCSEE OTW engine. NASA Technical Memorandum 81761. Apr. 1, 1981. pp. 1-30.

Bornstein, N. (1993). Oxidation of advanced intermetallic compounds. Journal de Physique IV, 1993, 03 (C9), pp. C9-367-C9-373.

Brennan, P.J. and Kroliczek, E.J. (1979). Heat pipe design handbook. Prepared for National Aeronautics and Space Administration by B & K Engineering, Inc. Jun. 1979. pp. 1-348.

Brines, G.L. (1990). The turbofan of tomorrow. Mechanical Engineering: The Journal of the American Society of Mechanical Engineers, 108(8), 65-67.

Bucknell, R.L. (1973). Influence of fuels and lubricants on turbine engine design and performance, fuel and lubircant analyses. Final Technical Report, Mar. 1971-Mar. 1973. pp. 1-252.

Bunker, R.S. (2005). A review of shaped hole turbine film-cooling technology. Journal of Heat Transfer vol. 127. Apr. 2005. pp. 441-453.

Carney, K., Pereira, M. Revilock, and Matheny, P. (2003). Jet engine fan blade containment using two alternate geometries. 4th European LS-DYNA Users Conference. pp. 1-10.

Chapman J.W., et al., "Control Design for an Advanced Geared Turbofan Engine", AIAA Joint Propulsion Conference 2017, Jul. 10, 2017-Jul. 12, 2017, Atlanta, GA, pp. 1-12.

Cheryan, M. (1998). Ultrafiltration and microfiltration handbook. Lancaster, PA: Tecnomic Publishing Company, Inc. pp. 171-236.

Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.

Civil Turbojet/Turbofan Specifications, Jet Engine Specification Database (Apr. 3, 2005).

Clarke, D.R. and Levi, C.G. (2003). Materials design for the next generation thermal barrier coatings. Annual. Rev. Mater. Res. vol. 33. 2003. pp. 383-417.

Cramoisi, G. Ed. (2012). Death in the Potomac: The crash of Air Florida Flight 90. Air Crash Investigations. Accident Report NTSB/AAR-82-8. p. 45-47.

Cusick, M. (1981). Avco Lycoming's ALF 502 high bypass fan engine. Society of Automotive Engineers, Inc. Business Aircraft Meeting & Exposition. Wichita, Kansas. Apr. 7-10, 1981. pp. 1-9.

Daggett, D.L., Brown, S.T., and Kawai, R.T. (2003). Ultra-efficient engine diameter study. NASA/CR-2003-212309. May 2003. pp. 1-52.

Dalton, III., W.N. (2003). Ultra high bypass ratio low noise engine study. NASA/CR-2003-212523. Nov. 2003. pp. 1-187.

Daly, M. Ed. (2008). Jane's Aero-Engine. Issue Twenty-three. Mar. 2008. p. 707-12.

Daly, M. Ed. (2010). Jane's Aero-Engine. Issue Twenty-seven. Mar. 2010. p. 633-636.

Damerau, J. (2014) What is the mesh stiffness of gears? Screen shot of query submitted by Vahid Dabbagh, answered by Dr. Jochan Damerau, Research General Managerat Bosch Corp., Japan. Retrieved from: https://www.researchgate.net/post/What_is_the_mesh_stiffness_of_gears.

Darrah, S. (1987). Jet fuel deoxygenation. Interim Report for Period Mar. 1987-Jul. 1988. pp. 1-22.

(56) References Cited

OTHER PUBLICATIONS

Dassault Falcon 900EX Easy Systems Summary. Retrieved from: http://www.smartcockpit.com/docs/F900EX-Engines.pdf pp 1-31.
Datasheet. CF6-80C2 high-bypass turbofan engines. Retreived from https://geaviation.com/sites/default/files/datasheet-CF6-80C2.pdf.
Datasheet. CFM56-5B For the Airbus A320ceo family and CFM56-7B for the Boeing 737 family. https://www.cfmaeroengines.com/.
Datasheet. Genx™ high bypass turbofan engines. Retreived from: https://www.geaviation.com/sites/default/files/datasheet-genx.pdf.
Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
Davis, D.G.M. (1973). Variable-pitch fans: Progress in Britain. Flight International. Apr. 19, 1973. pp. 615-617.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Declaration of Dr. Magdy Attia, In re U.S. Pat. No. 8,313,280, Executed Oct. 21, 2016, pp. 1-88.
Declaration of Dr. Magdy Attia, In re U.S. Pat. No. 8,517,668, Executed Dec. 8, 2016, pp. 1-81.
Liebeck, R.H., Andrastek, D.A., Chau, J., Girvin, R., Lyon, R., Rawdon, B.K., Scott, P.W. et al. (1995). Advanced subsonic airplane design & economics studies. NASA CR-195443. Apr. 1995. pp. 1-187.
Litt, J.S. (2018). Sixth NASA Glenn Research Center propulsion control and diagnostics (PCD) workshop. NASA/CP-2018-219891. Apr. 1, 2018. pp. 1-403.
Lord, W.K., MacMartin, D.G., and Tillman, T.G. (2000). Flow control opportunities in gas turbine engines. American Institute of Aeronautics and Astronautics. pp. 1-15.
Lynwander, P. (1983). Gear drive systems: Design and application. New York, New York: Marcel Dekker, Inc. pp. 145, 355-358.
MacIsaac, B. and Langston, R. (2011). Gas turbine propulsion systems. Chichester, West Sussex: John Wiley & Sons, Ltd. pp. 260-265.
Mancuso, J.R. and Corcoran, J.P. (2003). What are the differences in high performance flexible couplings for turbomachinery? Proceedings of the Thirty-Second Turbomachinery Symposium. 2003. pp. 189-207.
Manual. Student's Guide to Learning SolidWorks Software. Dassault Systemes—SolidWorks Corporation. pp. 1-156.
Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Mattingly, J.D. (1996). Elements of gas turbine propulsion. New York, New York: McGraw-Hill, Inc. pp. 1-18, 60-62, 223-234, 462-479, 517-520, 757-767, and 862-864.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.
Mattingly, J.D. (1996). Elements of gas turbine propulsion. New York, New York: McGraw-Hill, Inc. pp. 8-15.
Mavris, D.N., Schutte, J.S. (2016). Application of deterministic and probabilistic system design methods and enhancements of conceptual design tools for ERA project final report. NASA/CR-2016-219201. May 1, 2016. pp. 1-240.
McArdle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.
McCracken, R.C. (1979). Quiet short-haul research aircraft familiarization document. NASA-TM-81149. Nov. 1, 1979. pp 1-76.
McCune, M.E. (1993). Initial test results of 40,000 horsepower fan drive gear system for advanced ducted propulsion systems. AIAA 29th Joint Conference and Exhibit. Jun. 28-30, 1993. pp. 1-10.
McMillian, A. (2008) Material development for fan blade containment casing. Abstract, p. 1. Conference on Engineering and Physics: Synergy for Success 2006. Journal of Physics: Conference Series vol. 105. London, UK. Oct. 5, 2006.
Merriam-Webster's collegiate dictionary, 10th Ed. (2001). p. 1125-1126.
Merriam-Webster's collegiate dictionary, 11th Ed. (2009). p. 824.
Meyer, A.G. (1988). Transmission development of TEXTRON Lycoming's geared fan engine. Technical Paper. Oct. 1988. pp. 1-12.
Middleton, P. (1971). 614: VFW's jet feederliner. Flight International, Nov. 4, 1971. p. 725, 729-732.
Misel, O.W. (1977). QCSEE main reduction gears test program. NASA CR-134669. Mar. 1, 1977. pp. 1-222.
Moxon, J. How to save fuel in tomorrow's engines. Flight International. Jul. 30, 1983. 3873(124). pp. 272-273.
Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.
Munt, R. (1981). Aircraft technology assessment: Progress in low emissions engine. Technical Report. May 1981. pp. 1-171.
Nanocor Technical Data for Epoxy Nanocomposites using Nanomer 1.30E Nanoclay. Nnacor, Inc. Oct. 2004.
NASA Conference Publication. (1978). CTOL transport technology. NASA-CP-2036-PT-1. Jun. 1, 1978. pp. 1-531.
NASA Conference Publication. Quiet, powered-lift propulsion. Cleveland, Ohio. Nov. 14-15, 1978. pp. 1-420.
Neitzel, R., Lee, R., and Chamay, A.J. (1973). Engine and installation preliminary design. Jun. 1, 1973. pp. 1-333.
Neitzel, R.E., Hirschkron, R. and Johnston, R.P. (1976). Study of unconventional aircraft engines designed for low energy consumption. NASA-CR-135136. Dec. 1, 1976. pp. 1-153.
Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 2986. pp. 1-101.
Norton, M. and Karczub, D. (2003). Fundamentals of noise and vibration analysis for engineers. Press Syndicate of the University of Cambridge. New York: New York. p. 524.
Oates, G.C. (Ed). (1989). Aircraft propulsion systems and technology and design. Washington, D.C.: American Institute of Aeronautics, Inc. pp. 341-344.
Parametric study of STOL short-haul transport engine cycles and operational techniques to minimize community noise impact. NASA-CR-114759. Jun. 1, 1974. pp. 1-398.
Parker, R.G. and Lin, J. (2001). Modeling, modal properties, and mesh stiffness variation instabilities of planetary gears. Prepared for NASA. NASA/CR-2001-210939. May 2001. pp. 1-111.
Petrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.
Press release. The GE90 engine. Retreived from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old.
Product Brochure. Garrett TFE731. Allied Signal. Copyright 1987. pp. 1-24.
Pyrograf-III Carbon Nanofiber. Product guide. Retrieved Dec. 1, 2015 from: http://pyrografproducts.com/Merchant5/merchant.mvc?Screen=cp_nanofiber.
QCSEE ball spline pitch-change mechanism whirligig test report. (1978). NASA-CR-135354. Sep. 1, 1978. pp. 1-57.

(56) References Cited

OTHER PUBLICATIONS

QCSEE hamilton standard cam/harmonic drive variable pitch fan actuation system derail design report. (1976). NASA-CR-134852. Mar. 1, 1976. pp. 1-172.
QCSEE main reduction gears bearing development program final report. (1975). NASA-CR-134890. Dec. 1, 1975. pp. 1-41.
OCSEE over-the-wing final design report. (1977). NASA-CR-134848. Jun. 1, 1977. pp. 1-460.
QCSEE over-the-wing propulsion system test report vol. III—mechanical performance. (1978). NASA-CR-135325. Feb. 1, 1978. pp. 1-112.
QCSEE Preliminary analyses and design report. vol. 1. (1974). NASA-CR-134838. Oct. 1, 1974. pp. 1-337.
QCSEE preliminary analyses and design report. vol. II. (1974). NASA-CR-134839. Oct. 1, 1974. pp. 340-630.
QCSEE the aerodynamic and mechanical design of the QCSEE under-the-wing fan. (1977). NASA-CR-135009. Mar. 1, 1977. pp. 1-137.
QCSEE the aerodynamic and preliminary mechanical design of the QSCEE OTW fan. (1975). NASA-CR-134841. Feb. 1, 1975. pp. 1-74.
QCSEE under-the-wing engine composite fan blade design. (1975). NASA-CR-134840. May 1, 1975. pp. 1-51.
QCSEE under-the-wing engine composite fan blade final design test report. (1977). NASA-CR-135046. Feb. 1, 1977. pp. 1-55.
U.S. Department of Transportation: Federal Aviation Administration Type Certificate Data Sheet No. E6WE. Dated: May 9, 2000. p. 1-9.
Vasudevan, A.K. and Petrovic, J.J. (1992). A comparative overview of molybedenum disilicide composites. Materials Science and Engineering, A155, 1992. pp. 1-17.
Waters, M.H. and Schairer, E.T. (1977). Analysis of turbofan propulsion system weight and dimensions. NASA Technical Memorandum. Jan. 1977. pp. 1-65.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Wendus, B.E., Stark, D.F., Holler, R.P., and Funkhouser, M.E. (2003). Follow-on technology requirement study for advanced subsonic transport. NASA/CR-2003-212467. pp. 1-37.
Whitaker, R. (1982). ALF 502: plugging the turbofan gap. Flight International, p. 237-241, Jan. 30, 1982.
Wie, Y.S., Collier, F.S., Wagner, R.D., Viken, J.K., and Pfenniger, W. (1992). Design of a hybrid laminar flow control engine nacelle. AIAA-92-0400. 30th Aerospace Sciences Meeting & Exhibit. Jan. 6-9, 1992. pp. 1-14.
Wikipedia. Stiffness. Retrieved Jun. 28, 2018 from: https://en.wikipedia.org/wiki/Stiffness.
Wikipedia. Torsion spring. Retreived Jun. 29, 2018 from: https://en.wikipedia.org/wiki/Torsion_spring.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Willis, W.S. (1979). Quiet clean short-haul experimental engine (QCSEE) final report. NASA/CR-159473 pp. 1-289.
Winn, A. (Ed). (1990). Wide Chord Fan Club. Flight International, 4217(137). May 23-29, 1990. pp. 34-38.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Xie, M. (2008). Intelligent engine systems: Smart case system. NASA/CR-2008-215233. pp. 1-31.
Xu, Y., Cheng, L., Zhang, L., Ying, H., and Zhou, W. (1999). Oxidation behavior and mechanical properties of C/SiC composites with Si—MoSi2 oxidation protection coating. J. of Mat. Sci. vol. 34. 1999. pp. 6009-6014.
Zalud, T. (1998). Gears put a new spin on turbofan performance. Machine Design, 70(20), p. 104.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Zhao, J.C. and Westbrook, J.H. (2003). Ultrahigh-temperature materials for jet engines. MRS Bulletin. vol. 28(9). Sep. 2003. pp. 622-630.
Declaration of John Eaton, Ph.D. In re U.S. Pat. No. 8,869,568, Executed Mar. 28, 2016, pp. 1-87.
Declaration of Reza Abhari, In re U.S. Pat. No. 8,448,895, Executed Nov. 28, 2016, pp. 1-81.
Declaration of Reza Abhari. In re U.S. Pat. No. 8,695,920, claims 1-4, 7-14, 17 and 19, Executed Nov. 29, 2016, pp. 1-102.
Declaration of Reza Abhari. In re U.S. Pat. No. 8,695,920. Executed Nov. 30, 2016, pp. 1-67.
Declaration of Reza Abhari, Ph.D. In re U.S. Pat. No. 8,844,265, Executed Jun. 28, 2016, pp. 1-91.
Defeo, A. and Kulina, M. (1977). Quiet clean short-haul experimental engine (QCSEE) main reduction gears detailed design final report. Prepared for NASA. NASA-CR-134872. Jul. 1977. pp. 1-221.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Drago, R.J. (1974). Heavy-lift helicopter brings up drive ideas. Power Transmission Design. Mar. 1987. pp. 1-15.
Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Dudley, D.W., Ed. (1954). Handbook of practical gear design. Lancaster, PA: Technomic Publishing Company, Inc. pp. 3.96-3.102 and 8.12-8.18.
Dudley, D.W., Ed. (1962). Gear handbook. New York, NY: McGraw-Hill. pp. 14-17 (TOC, Preface, and Index).
Dudley, D.W., Ed. (1962). Gear handbook. New York, NY: McGraw-Hill. pp. 3.14-3.18 and 12.7-12.21.
Dudley, D.W., Ed. (1994). Practical gear design. New York, NY: McGraw-Hill. pp. 119-124.
Edkins, D.P., Hirschkron, R., and Lee, R. {1972). TF34 turbofan quiet engine study. Final Report prepared for NASA. NASA-CR-120914. Jan. 1, 1972. pp. 1-99.
Edwards, T. and Zabarnick, S. (1993). Supercritical fuel deposition mechanisms. Ind. Eng. Chem. Res. vol. 32. 1993. pp. 3117-3122.
El-Sayad, A.F. (2008). Aircraft propulsion and gas turbine engines. Boca Raton, FL: CRC Press. pp. 215-219 and 855-860.
European Search Report for Application No. EP07252647.8, dated Jan. 14, 2011, 8 pages.
European Search Report for Application No. EP12180834.9, dated Dec. 7, 2012, 6 pages.
Faghri, A. (1995). Heat pipe and science technology. Washington, D.C.: Taylor & Francis, pp. 1-60.
Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.
File History for U.S. Appl. No. 12/131,876.
Fisher, K., Berton, J., Guynn, M., Haller B., Thurman, D., and Tong, M. (2012). NASA's turbofan engine concept study for a next-generation single-aisle transport. Presentation to ICAO's noise technology independent expert panel. Jan. 25, 2012. pp. 1-23.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Frankenheld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Garret TFE731 Turbofan Engine (CAT C). Chapter 79: Lubrciation System. TTFE731 Issue 2. 2010. pp. 1-24.

(56) References Cited

OTHER PUBLICATIONS

Gates, D. Bombardier flies at higher market. Seattle Times. Jul. 13, 2008. pp. C6.

Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A55, 1992. pp. 147-158.

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

Gliebe, P.R., Ho, P.Y., and Mani, R. (1995). UHB engine fan and broadband noise reduction study. NASA CR-198357. Jun. 1995. pp. 1-48.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Gray, D.E. (1978). Energy efficient engine preliminary design and integration studies. NASA-CP-2036-PT-1. Nov. 1978. pp. 89-110.

Gray, D.E. (1978). Energy efficient engine preliminary design and integration studies. Prepared for NASA. NASA CR-135396. Nov. 1978. pp. 1-366.

Gray, D.E. and Gardner, W.B. (1983). Energy efficient engine program technology benefit/cost study—vol. 2. NASA CR-174766. Oct. 1983. pp. 1-118.

Greitzer, E.M., Bonnefoy, P.A., Delaroseblanco,E., Dorbian, C.S., Drela, M., Hall, D.K., Hansman, R.J., Hileman, J.I., Liebeck, R.H., Levegren, J. (2010). N+3 aircraft concept designs and trade studies, final report. vol. 1. Dec. 1, 2010. NASA/CR-2010-216794/vol. 1. pp. 1-187.

Griffiths, B. (2005). Composite fan blade containment case. Modern Machine Shop. Retrieved from: http://www.mmsonline.com/articles/composite-fan-blade-containment-case pp. 1-4.

Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.

Gunston, B. (Ed.) (2000). Jane's aero-engines, Issue seven. Coulsdon, Surrey, UK: Jane's Information Group Limited. pp. 510-512.

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.

Guynn, M.D., Berton, J.J., Fisher, K.L., Haller, W.J., Tong, M. T., and Thurman, D.R. (2009). Analysis of turbofan design options for an advanced single-aisle transport aircraft. American Institute of Aeronautics and Astronautics. pp. 1-13.

Guynn, M.D., Berton, J.J., Fisher, K.L., Haller, W.J., Tong, M.T., and Thurman, D.R. (2009). Engine concept study for an advanced single-aisle transport. NASA/TM-2009-215784. pp. 1-97.

Haldenbrand, R. and Norgren, W.M. (1979). Airesearch QCGAT program [quiet clean general aviation turbofan engines]. NASA-CR-159758. pp. 1-199.

Hall, C.A. and Crichton, D. (2007). Engine design studies for a silent aircraft. Journal of Turbomachinery, 129, 479-487.

Han, J., Dutta, S., and Ekkad, S.V. (2000). Gas turbine heat transfer and cooling technology. New York, NY: Taylor & Francis. pp. 1-25, 129-157, and 160-249.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.

Hazlett, R.N. (1991). Thermal oxidation stability of aviation turbine fuels. Philadelphia, PA: ASTM. pp. 1-163.

Heidelberg, L.J., and Hall, D.G. (1992). Acoustic mode measurements in the inlet of a model turbofan using a continuously rotating rake. NASA-TM-105989. Prepared for the 31st Aerospace Sciences Meeting. Reno, NV. Jan. 11-14, 1993. pp. 1-30.

Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.

Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https://www.cgabusinessdesk.com/document/aviation_tech_review.pdf.

Hendricks, E.S. and Tong, M.T. (2012). Performance and weight estimates for an advanced open rotor engine. NASA/TM-2012-217710. pp 1-13.

Hess, C. (1998). Pratt & Whitney develops geared turbofan. Flug Revue 43(7). Oct. 1998.

QCSEE under-the-wing engine composite fan blade preliminary design test report. (1975). NASA-CR-134846. Sep. 1, 1975. pp. 1-56.

QCSEE under-the-wing engine digital control system design report. (1978). NASA-CR-134920. Jan. 1, 1978. pp. 1-309.

Quiet clean general aviation turbofan (QCGAT) technology study final report vol. I. (1975). NASA-CR-164222. Dec. 1, 1975. pp. 1-186.

Ramsden, J.M. (Ed). (1978). The new European airliner. Flight International, 113(3590). Jan. 7, 1978. pp. 39-43.

Ratna, D. (2009). Handbook of thermoset resins. Shawbury, UK: iSmithers. pp. 187-216.

Rauch, D. (1972). Design study of an air pump and integral lift engine ALF-504 using the Lycoming 502 core. Prepare for NASA. Jul. 1972. pp. 1-182.

Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.

Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.

Riegler, C., and Bichlmaier, C. (2007). The geared turbofan technology—Opportunities, challenges and readiness status. Porceedings CEAS. Sep. 10-13, 2007. Berlin, Germany, pp. 1-12.

Rolls-Royce M45H. Jane's Aero-engines, Aero-engines—Turbofan. Feb. 24, 2010.

Rotordynamic instability problems in high-performance turbomachinery. (1986). NASA conference publication 2443. Jun. 2-4, 1986.

Roux, E. (2007). Turbofan and turbojet engines database handbook. Editions Elodie Roux. Blagnac: France. pp. 1-595.

Salemme, C.T. and Murphy, G.C. (1979). Metal spar/superhybrid shell composite fan blades. Prepared for NASA. NASA-CR-159594. Aug. 1979. pp. 1-127.

Sargisson, D.F. (1985). Advanced propfan engine technology (APET) and single-rotation gearbox/pitch change mechanism. NASA Contractor Report—168113. R83AEB592. Jun. 1, 1985. pp. 1-476.

Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.

Schaefer, J.W., Sagerser, D.R., and Stakolich, E.G. (1977). Dynamics of high-bypass-engine thrust reversal using a variable-pitch fan. Technical Report prepared for NASA. NASA-TM-X-3524. May 1, 1977. pp. 1-33.

Seader, J.D. and Henley, E.J. (1998). Separation process principles. New York, NY: John Wiley & Sons, Inc. pp. 722-726 and 764-771.

Shah, D.M. (1992). MoSi2 and other silicides as high temperature structural materials. Superalloys 1992. The Minerals, Metals, & Materials Society, pp. 409-422.

Shorter Oxford English Dictionary, 6th Edition. (2007), vol. 2, N-Z, pp. 1888.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Singh, A. (2005). Application of a system level model to study the planetary load sharing behavior. Jounal of Mechanical Design. vol. 127. May 2005. pp. 469-476.

(56) References Cited

OTHER PUBLICATIONS

Singh, B. (1986). Small engine component technology (SECT) study. NASA CR-175079. Mar. 1, 1986. pp. 1-102.
Singh, R. and Houser, D.R. (1990). Non-linear dynamic analysis of geared systems. NASA-CR-180495. Feb. 1, 1990. pp 1-263.
Smith, C.E., Hirschkron, R., and Warren, R.E. (1981). Propulsion system study for small transport aircraft technology (STAT). Final report. NASA-CR-165330. May 1, 1981. pp. 1-216.
Smith-Boyd, L. and Pike, J. (1986). Expansion of epicyclic gear dynamic analysis program. Prepared for NASA. NASA CR-179563. Aug. 1986. pp. 1-98.
Sowers, H.D. and Coward, W.E. (1978). QCSEE over-the-wing (OTW) engine acuostic design. NASA-CR-135268. Jun. 1, 1978. pp. 1-52.
Spadaccini, L.J., and Huang, H. (2002). On-line fuel deoxygenation for coke suppression. ASME, Jun. 2002. pp. 1-7.
Spadaccini, L.J., Sobel, D.R., and Huang, H. (2001). Deposit formation and mitigation in aircraft fuels. Journal of Eng. For Gas Turbine and Power, vol. 123. Oct. 2001. pp 741-746.
Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.
Supplementary European Search Report for Application No. EP13865131.0, dated Apr. 26, 2016, 8 pages.
Sutliff, D. (2005). Rotating rake turbofan duct mode measurement system. NASA TM-2005-213828. Oct. 1, 2005. pp. 1-34.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Sweetman, B. and Sutton, O. (1998). Pratt & Whitney's surprise leap. Interavia Business & Technology, 53.621, p. 25.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.
Technical Data. Teflon. WS Hampshire Inc. Retrieved from: http://catalog.wshampshire.com/Asset/psg_teflon_ptfe.pdf.
Technical Report. (1975). Quiet Clean Short-haul Experimental Engine (QCSEE) UTW fan preliminary design. NASA-CR-134842. Feb. 1, 1975. pp. 1-98.
Technical Report. (1977). Quiet Clean Short-haul Experimental Engine (QCSEE) Under-the-Wing (UTW) final design report. NASA-CR-134847. Jun. 1, 1977. pp. 1-697.
Thulin, R.D., Howe, D.C., and Singer, I.D. (1982). Energy efficient engine: High pressure turbine detailed design report. Prepared for NASA. NASA CR-165608. Recevied Aug. 9, 1984. pp. 1-178.
Tong, M.T., Jones, S.M., Haller, W.J., and Handschuh, R.F. (2009). Engine conceptual design studies for a hybrid wing body aircraft. NASA/TM-2009-215680. Nov. 1, 2009. pp. 1-15.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Tummers, B. (2006). DataThief III. Retreived from: https://datathief.org/DatathiefManual.pdf pp. 1-52.
Turbomeca Aubisque. Jane's Aero-engines, Aero-engines—Turbofan. Nov. 2, 2009.
Turner, M. G., Norris, A., and Veres, J.P. (2004). High-fidelity three-dimensional simulation of the GE90. NASA/TM-2004-212981. pp. 1-18.
Type Certificate Data Sheet No. E6NE. Department of Transportation Federal Aviation Administration. Jun. 7, 2002. pp. 1-10.
U.S. Department of Transportation: Federal Aviation Administration Advisory Circular, Runway overrun prevention, dated: Nov. 6, 2007, p. 1-8 and Appendix 1 pp. 1-15, Appendix 2 pp. 1-6, Appendix 3 pp. 1-3, and Appendix 4 pp. 1-5.
U.S. Department of Transportation: Federal Aviation Administration Advisory Circular. Standard operating procedures for flight deck crewmembers, Dated: Feb. 27, 2003, p. 1-6 and Appendices.
Hill, P.G., Peterson, C.R. (1965). Mechanics and thermodynamics of propulsion. Addison-Wesley Publishing Company, Inc. pp. 307-308.
Hill, P.G., Peterson, C.R. (1992). Mechanics and thermodynamics of propulsion, 2nd Edition. Addison-Wesley Publishing Company, Inc. pp. 400-406.
Holcombe, V. (2003). Aero-Propulsion Technology (APT) task V low noise ADP engine definition study. NASA CR-2003-212521. Oct. 1, 2003. pp. 1-73.
Honeywell Learjet 31 and 35/36 TFE731-2 to 2C Engine Upgrade Program. Sep. 2005. pp. 1-4.
Honeywell LF502. Jane's Aero-engines, Aero-engines—Turbofan. Feb. 9, 2012.
Honeywell LF502. Jane's Aero-engines, Aero-engines—Turbofan. Aug. 17, 2016.
Honeywell LF507. Jane's Aero-engines, Aero-engines—Turbofan. Feb. 9, 2012.
Honeywell Sabreliner 65 TFE731-3 to -3D Engine Upgrade Program. Oct. 2005. pp. 1-4.
Honeywell TFE731. Jane's Aero-engines, Aero-engines—Turbofan. Jul. 18, 2012.
Honeywell TFE731 Pilot Tips. pp. 1-143.
Honeywell TFE731-5AR to -5BR Engine Conversion Program. Sep. 2005. pp. 1-4.
Horikoshi, S. and Serpone, N. (2013). Introduction to nanoparticles. Microwaves in nanoparticle synthesis. Wiley-VCH Verlag GmbH & Co. KGaA. pp. 1-24.
Howard, D.F. (1976). QCSEE preliminary under the wing flight propulsion system analysis report. NASA CR-134868. Feb. 1, 1976. pp. 1-260.
Howe, D.C. and Wynosky, T.A. (1985). Energy efficient engine program advanced turbofan nacelle definition study. NASA CR-174942. May 1, 1985. pp. 174.
Howe, D.C., and Wynosky, T.A. (1985). Energy efficient engine program advanced turbofan nacelle definition study. NASA-CR-174942. May 1985. pp. 1-60.
Howe, D.C., and Wynosky, T.A. (1985). Energy efficient engine program advanced turbofan nacelle definition study. NASA-CR-174942. May 1985. University of Washington dated Dec. 13, 1990. pp. 1-14.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Hughes, C. (2010). Geared turbofan technology. NASA Environmentally Responsible Aviation Project. Green Aviation Summit. NASA Ames Research Center. Sep. 8-9, 2010. pp. 1-8.
International Preliminary Report on Patentability for PCT Application No. PCT/US2013/062220, dated Apr. 9, 2015, 10 pages.
International Search Report and Written Opinion for PCT Application No. PCT/US2013/062220 dated Aug. 15, 2014, 17 pages.
Ivchenko—Progress AI-727M. Jane's Aero-engines, Aero-engines—Turbofan. Nov. 27, 2011.

(56) References Cited

OTHER PUBLICATIONS

Ivchenko-Progress D-436. Jane's Aero-engines, Aero-engines—Turbofan. Feb. 8, 2012.

Ivchenko-Progress D-727. Jane's Aero-engines, Aero-engines—Turbofan. Feb. 7, 2007.

Jacobson, N.S. (1993). Corrosion of silicon-based ceramics in combustion environments. J. Am. Ceram. Soc. 76(1). pp. 3-28.

Jeng, Y.-L., Lavernia, E.J. (1994). Processing of molybdenum disilicide. J. of Mat. Sci. vol. 29. 1994. pp. 2557-2571.

Johnston, R.P. and Hemsworth, M.C. (1978). Energy efficient engine preliminary design and integration studies. Jun. 1, 1978. pp. 1-28.

Johnston, R.P., Hirschkron, R., Koch, C.C., Neitzel, R.E., and Vinson, P.W. (1978). Energy efficient engine: Preliminary design and integration study—final report. NASA CR-135444. Sep. 1978. pp 1-401.

Jorgensen, P.J., Wadsworth, M.E., and Cutler, I.B. (1961). Effects of water vapor on oxidation of silicon carbide. J. Am. Ceram. Soc. 44(6). pp. 248-261.

Kahn, H., Tayebi, N., Ballarini, R., Mullen, R.L., Heuer, A.H. (2000). Fracture toughness of polysilicon MEM devices. Sensors and Actuators vol. 82. 2000. pp. 274-280.

Kandebo, S.W. (1998). Geared-Turbofan engine design targets cost, complexity. Aviation Week & Space Technology, 148(8). p. 34-5.

Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.

Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.

Kerrebrock, J.L. (1977). Aircraft engines and gas turbines. Cambridge, MA: The MIT Press, p. 11.

Knip, Jr., G. (1987). Analysis of an advanced technology subsonic turbofan incorporating revolutionary materials. NASA Technical Memorandum. May 1987. pp 1-23.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Krantz, T.L. (1990). Experimental and analytical evaluation of efficiency of helicopter planetary stage. NASA Technical Paper. Nov. 1990. pp. 1-19.

Krenkel, W., Naslain, R., and Schneider, H. Eds. (2001). High temperature ceramic matrix composites pp. 224-229. Weinheim, DE: Wiley-VCH Verlag GmbH.

Kurzke, J. (2001). GasTurb 9: A program to calculate design and off-design performance of gas turbines. Retrieved from: https://www.scribd.com/document/92384867/GasTurb9Manual.

Kurzke, J. (2012). GasTurb 12: Design and off-design performance of gas turbines. Retrieved from: https://www.scribd.com/document/153900429/GasTurb-12.

Kurzke, J. (2008). Preliminary Design, Aero-engine design: From state of the art turbofans towards innovative architectures. pp. 1-72.

Kurzke, J. (2009). Fundamental differences between conventional and geared turbofans. Proceedings of ASME Turbo Expo: Power for Land, Sea, and Air. 2009, Orlando, Florida. pp. 145-153.

Langston, L. and Faghri, A. Heat pipe turbine vane cooling. Prepared for Advanced Turbine Systems Annual Program Review. Morgantown, West Virginia. Oct. 17-19, 1995. pp. 3-9.

Lau, K., Gu, C., and Hui, D. (2005). A critical review on nanotube and nanotube/nanoclay related polymer composite materials. Composites: Part B 37(2006) 425-436.

Leckie F.A., et al., "Strength and Stiffness of Engineering Systems," Mechanical Engineering Series, Springer, 2009, pp. 1-3.

Lee, K.N. (2000). Current status of environmental barrier coatings for Si-Based ceramics. Surface and Coatings Technology 133-134, 2000. pp. 1-7.

Levintan, R.M. (1975). Q-Fan demonstrator engine. Journal of Aircraft. vol. 12( 8). Aug. 1975. pp. 658-663.

Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.

\* cited by examiner

OIL BAFFLE FOR GAS TURBINE FAN DRIVE GEAR SYSTEM

REFERENCE TO RELATED APPLICATIONS

This application is a continuation of U.S. patent application Ser. No. 16/833,754, filed on Mar. 30, 2020, which is a continuation of U.S. patent application Ser. No. 15/808,613, filed on 9 Nov. 2017, which is a continuation of U.S. patent application Ser. No. 14/485,039, filed on 12 Sep. 2014, which is a continuation of U.S. patent application Ser. No. 13/861,602, filed on 12 Apr. 2013, now U.S. Pat. No. 8,898,900, issued Dec. 2, 2014, which is a continuation of U.S. patent application Ser. No. 13/346,790, filed on 10 Jan. 2012, now U.S. Pat. No. 8,640,336, issued 4 Feb. 2014. U.S. patent application Ser. No. 13/346,790 is a continuation of U.S. patent application Ser. No. 12/718,436, filed on 5 Mar. 2010, now U.S. Pat. No. 8,276,275, issued 2 Oct. 2012 which is a divisional of U.S. patent application Ser. No. 11/481,112, filed 5 Jul. 2006, now U.S. Pat. No. 7,704,178, issued 27 Apr. 2010.

BACKGROUND OF THE INVENTION

This disclosure relates to a gas turbine engine architecture.

Gas turbine engines typically employ an epicyclic gear train connected to a turbine section of the engine, which is used to drive the turbo fan. In a typical epicyclic gear train, a sun gear receives rotational input from a turbine shaft through a compressor shaft. A carrier supports intermediate gears that surround and mesh with the sun gear. A ring gear surrounds and meshes with the intermediate gears. In arrangements in which the carrier is fixed against rotation, the intermediate gears are referred to as "star" gears and the ring gear is coupled to an output shaft that supports the turbo fan. In arrangements in which the ring gear is fixed against rotation, the intermediate gears are referred to as "planetary" gears and the carrier is coupled to the output shaft that supports the turbo fan.

The epicyclic gear train gears must receive adequate lubrication during operation of the turbine engine. To this end, the carrier includes oil spray bars arranged between the intermediate gears and the sun gear to spray oil directly on those gears. Separate oil baffles, which may be integral with or separate from the carrier, are arranged between the intermediate gears to collect the sprayed oil and retain it in the area of the intermediate gears for prolonged lubrication before the oil is collected in a lubricant gutter associated with the ring gear.

Prior art carrier arrangements have required multiple components and complicated assembly in order to accommodate the oil baffles. For example, one or both of the side walls of the carrier must be assembled around the intermediate gears resulting in a multi-piece carrier. Furthermore, separate oil spray bars and oil baffles complicate assembly and increase cost. What is needed is a simplified oil baffle and spray bar arrangement that enables a simpler and less expensive carrier design.

SUMMARY OF THE INVENTION

In one exemplary embodiment, a turbo fan engine includes a housing that supports a compressor section. At least one compressor hub is within the compressor section. A compressor shaft is arranged in the compressor section. An epicyclic gear train is coupled to the compressor shaft. At least one compressor hub and the compressor shaft are coupled at a common attachment point. The epicyclic gear train includes a carrier. A sun gear and intermediate gears are arranged about and intermeshing with the sun gear. The intermediate gears are supported by the carrier. A baffle is supported relative to the carrier and includes a lubrication passage near at least one of the sun gear and intermediate gears for directing a lubricant on at least one of the sun gear and the intermediate gears.

In a further embodiment of any of the above, the lubrication passage includes a primary passage that extends laterally between the walls and first and second passages and is in communication with the primary passage and respectively terminates near the sun gear and intermediate gears.

In a further embodiment of any of the above, a ring gear intermeshes with the intermediate gears and an output shaft is interconnected to the ring gear. An input shaft is interconnected to the sun gear.

In a further embodiment of any of the above, the carrier is fixed relative to a housing.

In a further embodiment of any of the above, the carrier includes mounts. The housing supports a torque frame that is secured to the mounts.

In a further embodiment of any of the above, the baffle is secured to the carrier with fasteners.

In a further embodiment of any of the above, the baffle is integral with the carrier.

In another exemplary embodiment, a turbo fan engine includes at least one compressor hub within a compressor section. A compressor shaft is arranged in the compressor section. An epicyclic gear train is coupled to the compressor shaft. At least one compressor hub and the compressor shaft are coupled at a common attachment point. The epicyclic gear train includes spaced apart walls with circumferentially spaced mounts that interconnect the walls. The mounts provide circumferentially spaced apart apertures between the mounts at an outer circumference of the walls. Baffles are arranged between the walls near the mounts. The baffles are secured to at least one of the walls and the mounts by a fastening element. Gear pockets are provided between the baffles. The baffles include a lubrication passage that terminates at a respective one of the gear pockets.

In a further embodiment of any of the above, the lubrication passage includes a primary passage that extends laterally between the walls and first and second passages and is in communication with the primary passage and respectively terminates near the sun gear and intermediate gears.

In a further embodiment of any of the above, a ring gear intermeshes with the intermediate gears and an output shaft is interconnected to the ring gear. An input shaft is interconnected to the sun gear.

In a further embodiment of any of the above, the carrier is fixed relative to a housing.

In a further embodiment of any of the above, the housing supports a torque frame that is secured to the mounts.

In a further embodiment of any of the above, the baffles are secured to the carrier with fasteners.

In a further embodiment of any of the above, the baffle are integral with the carrier.

In another exemplary embodiment, a turbo fan engine includes at least one compressor hub within a compressor section. A compressor shaft is arranged in the compressor section. An epicyclic gear train is driven by the compressor shaft. At least one compressor hub and the compressor shaft are coupled at a common attachment point. The epicyclic gear train includes spaced apart walls with circumferentially spaced mounts that interconnect the walls. The mounts provide circumferentially spaced apart apertures between the mounts at an outer circumference. Baffles are arranged between the walls near the mounts. The baffles are secured to at least one of the walls and the mounts by a fastening element. Gear pockets are provided between the baffles. The baffles include a lubrication passage that terminates at a respective one of the gear pockets. The lubrication passage includes a primary passage that extends laterally between the walls and first and second passages and is in communication with the primary passage and arranged transverse to one another. Intermediate gears are arranged between the baffles and intermesh with a sun gear. The first passage is directed at the sun gear and the second passage is directed at the intermediate gears.

In a further embodiment of any of the above the lubrication passage includes a primary passage that extends laterally between the walls and first and second passages and is in communication with the primary passage and respectively terminates near the sun gear and intermediate gears.

In a further embodiment of any of the above, a ring gear intermeshes with the intermediate gears and an output shaft interconnected to the ring gear. An input shaft is interconnected to the sun gear.

In a further embodiment of any of the above, a carrier is fixed relative to a housing.

In a further embodiment of any of the above, the housing supports a torque frame that is secured to the mounts.

In a further embodiment of any of the above, the baffles are secured to the carrier with fasteners.

In a further embodiment of any of the above, the baffles are integral with the carrier.

In another exemplary embodiment, a method of designing a turbo fan engine includes defining at least one compressor hub within a compressor section. A compressor shaft arranged in the compressor section is defined. An epicyclic gear train that is coupled to the compressor shaft is defined. At least one compressor hub and the compressor shaft are coupled at a common attachment point.

In a further embodiment of any of the above, the epicyclic gear train defining step includes defining a carrier that has spaced apart walls with circumferentially spaced mounts that interconnect the walls. The mounts are defined to provide circumferentially spaced apart apertures between the mounts at an outer circumference of the carrier. A sun gear and intermediate gears arranged about and intermeshing with the sun gear are defined. The intermediate gears are defined to be supported by the carrier. The intermediate gears are defined to extend through the apertures to intermesh with a ring gear. A baffle supported relative to the carrier is defined and includes a lubrication passage near at least one of the sun gear and intermediate gears for directing a lubricant on at least one of the sun gear and intermediate gears. The lubrication passage includes a primary passage that extends laterally between the walls and first and second passages and is in communication with the primary passage.

In a further embodiment of any of the above, a tube that extends through a hole in one of the walls is defined. The tube is configured to be in communication with the primary passage.

In a further embodiment of any of the above, a ring gear intermeshing with the intermediate gears is defined. An output shaft is interconnected to the ring gear. An input shaft interconnected to the sun gear is defined.

In a further embodiment of any of the above, the carrier to be fixed relative to a housing is defined.

In a further embodiment of any of the above, the housing to support a torque frame that is configured to be secured to the mounts is defined.

In a further embodiment of any of the above, the baffle to be secured to the carrier with fasteners is defined.

In a further embodiment of any of the above, defining the baffle to be integral with carrier is defined.

DETAILED DESCRIPTION OF THE PREFERRED EMBODIMENT

Figure 1:
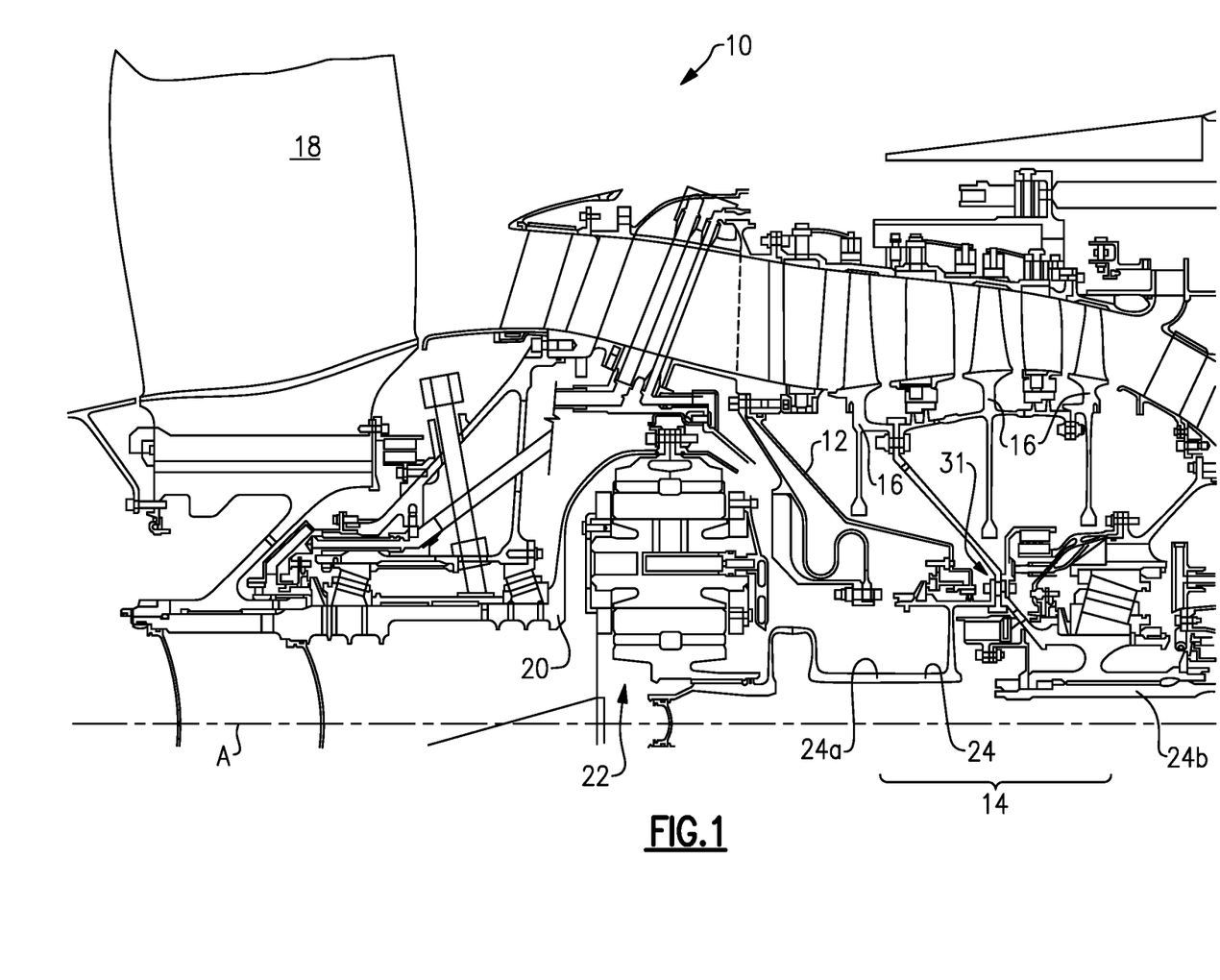
FIG. 1 is a partial cross-sectional view of a front portion of a gas turbine engine illustrating a turbo fan, epicyclic gear train and a compressor section.

A portion of a gas turbine engine 10 is shown schematically in FIG. 1. The turbine engine 10 includes a fixed housing 12 that is constructed from numerous pieces secured to one another. A compressor section 14 having compressor hubs 16 with blades are driven by a turbine shaft (not shown) about an axis A. A turbo fan 18 is supported on a turbo fan shaft 20 that is driven by a compressor shaft 24, which supports the compressor hubs 16, through an epicyclic gear train 22.

Figure 2:
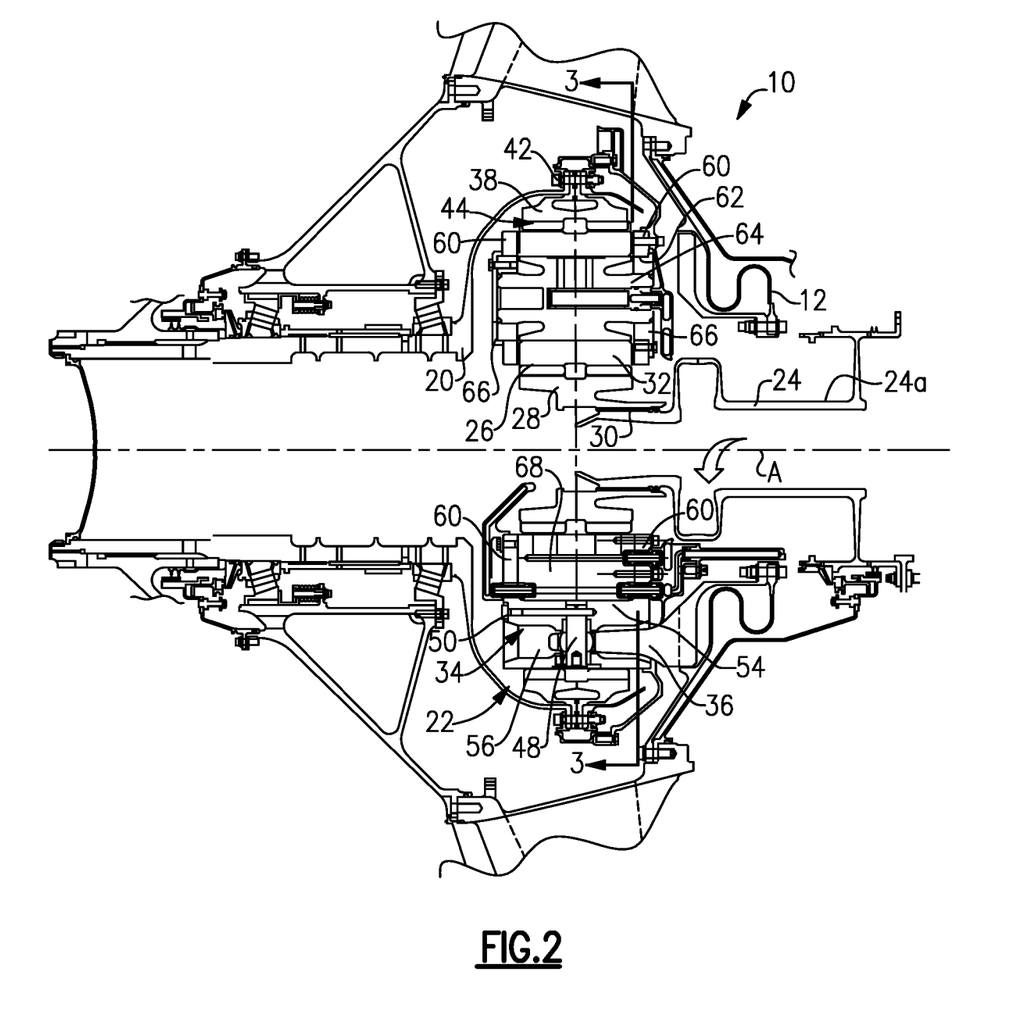
FIG. 2 is a cross-sectional view of the epicyclic gear train shown in FIG. 1.

In the example arrangement shown, the epicyclic gear train 22 is a star gear train. Of course, the claimed invention also applies to other epicyclic gear trains such as a planetary arrangement. Referring to FIG. 2, the epicyclic gear train 22 includes a sun gear 28 that is connected to the compressor shaft 24, which provides rotational input, by a splined connection 30.

In the example arrangement shown, the compressor shaft is a two-part shaft having a first shaft 24a and a second shaft 24b. The first shaft 24a is connected to the second shaft 24b via a connection member 31, which is a bolt and nut in this example.

A carrier 34 is fixed to the housing 12 by a torque frame 36. The carrier 34 supports intermediate gears (which are star gears 32 in the arrangement shown) that are coupled to the sun gear 28 by meshed interfaces 26 between the teeth of the sun and star gears 28, 32. A ring gear 38 surrounds the carrier 34 and is coupled to the star gears 32 by meshed interfaces 44. The ring gear 38, which provides rotational output, is secured to the turbo fan shaft 20 by connection 42.

Figure 3:
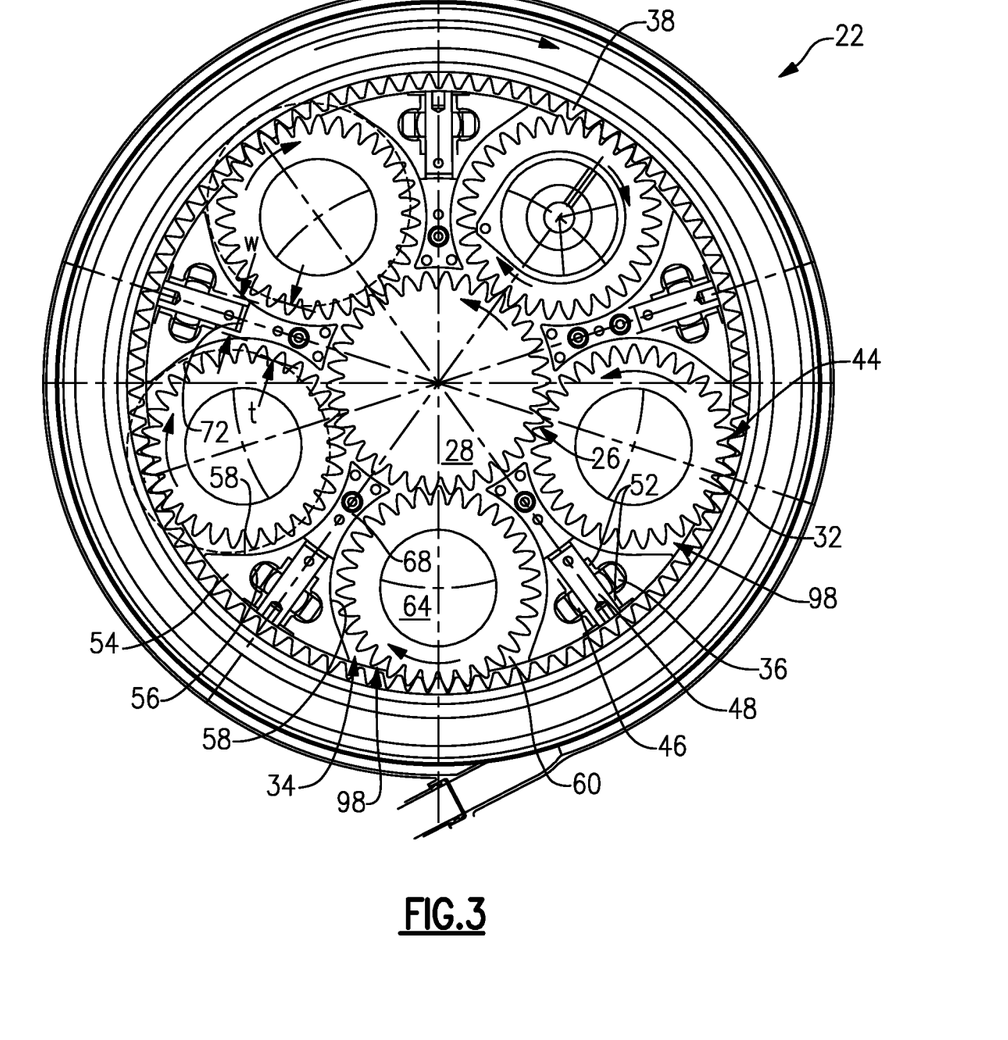
FIG. 3 is an end view of the epicyclic gear train taken along line 3-3 in FIG. 2 with a pair of star gears shown in phantom in an installation position.

In one example, the torque frame 36 grounds the carrier 34 to the housing 12 in a known manner. For example, mounts 54 have apertures 56 receiving fingers of the torque frame 36, as shown in FIGS. 2 and 3. Pins 48 that extend through spherical bearings 46 and bushings 52 secure the fingers to the carrier 34. Fasteners 50 retain the pins 48 to the carrier 34.

The carrier 34 is a unitary structure manufactured from one piece for improved structural rigidity and ease of assembly. The carrier 34 includes spaced apart side walls 60 that are interconnected by the mounts 54, which are generally wedge-shaped members, as best shown in FIG. 3. The mounts 54 and side walls 60 are unitary with one another. The mounts 54 have opposing curved surfaces 58 that are in close proximity to the star gears 32 and generally follow the curvature of the teeth of the star gears 32 so that any oil on the curved surfaces 58 will likely find its way to the star gears 32 for additional lubrication.

The mounts 54 are circumferentially spaced about the carrier 34 to provide apertures 98 through which the star gears 32 extend to engage the ring gear 38. Returning to FIG. 2, the side walls 60 include holes 62 for receiving a journal bearing 64 that supports each of the star gears 32. Each journal bearing 64 is retained within the carrier 34 by retainers 66 fastened to the side walls 60.

Figure 4:
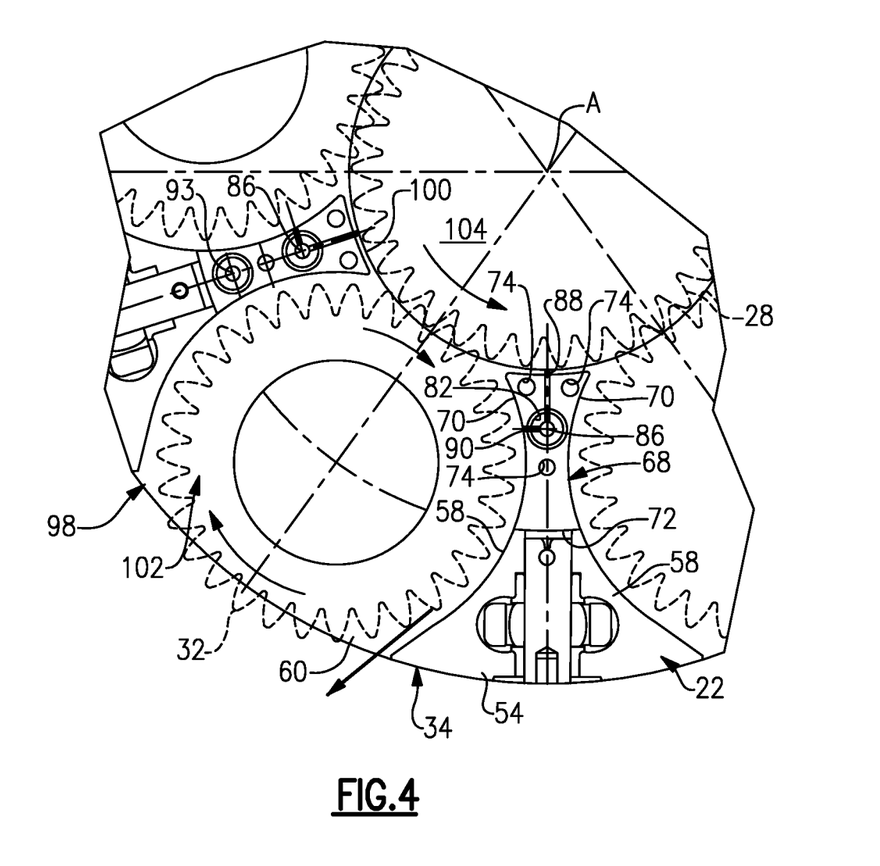
FIG. 4 is an enlarged view of a portion of the epicyclic gear train shown in FIG. 3 with a sun gear and star gears shown in phantom.
Figure 5:
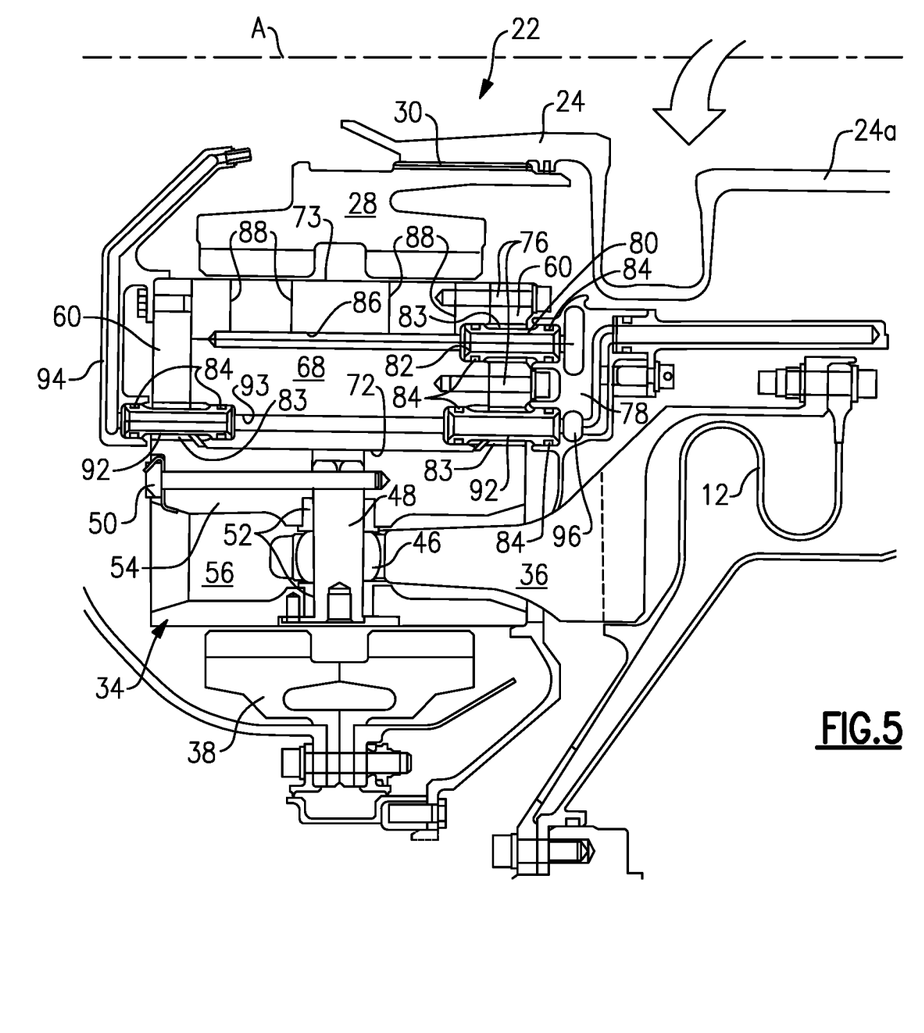
FIG. 5 is an enlarged view of a portion of the epicyclic gear train shown in FIG. 2.

Oil baffles 68 are arranged between the side walls 60 near each of the mounts 54, best shown in FIG. 2. Referring to FIGS. 4 and 5, the baffles 68 include ends 72 that abut the mounts 54, in the example shown. The baffles 68 also include opposing curved surfaces 70 arranged in close proximity to the star gears 28. The curved surfaces 58, 70 are contiguous with and adjoin one another, in the example shown, and provide gear pockets 102 that receive the star gears 32. A gear pocket 104, which receives the sun gear 28, is also provided between a surface 73 on each of the baffles 68 opposite the ends 72.

In one example, one of the side walls 60 includes holes 74 that receive fasteners 76 which secure each of the baffles 68 to the carrier 34. The baffles 68 include a lubrication passage provided by a primary passage 86 that fluidly communicates with a lubricant distributor 78. The lubricant distributor 78 is fed oil from a lubricant supply 96. In one example, the baffles 68 include openings 82 that receive a tube 80 extending through a hole 83 in the side wall 60. Seals 84 seal the tube 80 to the opening 82 and lubricant distributor 78. Other tubes 92 having seals 84 are used to provide oil to an external spray bar 94 through another lubrication passage (spray bar passage 93 that extends through one of the baffles 68). The external spray bar 94 is secured to the carrier 34 and sprays oil in the vicinity of the sun gear 28 near the splined connection 30 (shown in FIGS. 2 and 5).

The primary passage 86 is in communication with first and second passages 88, 90 that spray oil on the teeth of the sun and star gears 28, 32. In the example shown, the first and second passages 88, 90 are arranged ninety degrees from one another.

With the example baffles 68, lubricant distribution is integrated into the baffle so that separate components are eliminated. The baffles 68 can be constructed from a different, lighter weight material than the carrier 34.

The example carrier 34 can be constructed from one piece, which improves the structural integrity of the carrier. A central opening 100 is machined in at least one of the side walls 60 and provides the gear pocket 104. Gear pockets 102 are machined between the side walls 60 and mounts 54 for each of the star gears 32 and form apertures 98 at an outer circumference of the carrier 34. Referring to FIG. 3, the star gears 32 are inserted into the central opening 100 and moved radially outwardly so that they extend through the apertures 98 and are preferably in abutment with the mounts 54 (position indicated by dashed lines in FIG. 3). In this position, there is an adequate gap, t, between the teeth of adjacent star gears 32 to accommodate a width, w, of the end 72 of the baffles 68. Once the baffles 68 have been inserted, the star gears 32 can be repositioned, as shown by the solid lines, and the sun gear 28 can be inserted into the central opening 100 so that it meshes with the star gears 32. The baffles 68 are secured to the carrier 34 using fasteners 76.

The tubes 80, 92 can be inserted and the rest of the lubricant distribution system can be connected.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of assembly for a gas turbine engine comprising the steps of:
    assembling an epicyclic gear train including:
        positioning a carrier, the carrier including spaced apart side walls and circumferentially spaced mounts interconnecting the side walls, wherein circumferentially spaced apart apertures are established between the mounts at an outer circumference of the carrier, a plurality of intermediate gear pockets are established between adjacent pairs of the mounts, and at least one of the side walls includes a central opening, the carrier is a unitary structure with the side walls and the mounts unitary with one another;
        inserting intermediate gears through the central opening of the carrier and into a central gear pocket;
        moving each of the intermediate gears radially outward from the central gear pocket into a respective one of the intermediate gear pockets relative to an axis of the carrier, and then through a respective one of the apertures;
        inserting a plurality of baffles into the carrier in a space between the walls subsequent to the moving step, and securing the baffles to at least one of the side walls and to a respective one of the mounts, wherein the intermediate gear pockets are established between adjacent pairs of the baffles, and the baffles include respective lubrication passages;
        inserting a sun gear through the central opening and into the central gear pocket;
        moving each of the intermediate gears radially inward relative to an axis of the carrier subsequent to the step of inserting the sun gear such that the intermediate gears are arranged about and intermesh with the sun gear; and
        moving a ring gear into engagement with the intermediate gears such that the ring gear intermeshes with the intermediate gears;
    securing a torque frame to the mounts;
    fixedly attaching the torque frame to a housing;
    coupling the gear train to a turbo fan shaft; and
    supporting a turbo fan on the turbofan shaft.

2. The method as recited in claim 1, wherein the housing supports a compressor section having at least one compressor hub, and further comprising:
    arranging a compressor shaft in the compressor section to support the at least one hub; and
    connecting the sun gear to the compressor shaft such that the turbo fan shaft is driven by the compressor shaft through the gear train.

3. The method as recited in claim 2, further comprising:
    securing the ring gear to the turbofan shaft by a connection.

4. The method as recited in claim 3, wherein the intermediate gears extend through the apertures to intermesh with the ring gear subsequent to the step of moving each of the intermediate gears radially inward.

5. The method as recited in claim 4, wherein the step of inserting the plurality of baffles occurs such that each of the lubrication passages terminates at a respective one of the intermediate gear pockets for directing a lubricant on at least one of the intermediate gears.

6. The method as recited in claim 4, wherein the step of inserting the plurality of baffles occurs such that each of the lubrication passages terminates at the central gear pocket for directing a lubricant on the sun gear.

7. The method as recited in claim 4, wherein each of the lubrication passages includes first and second passages arranged transverse to one another, and the first passage is directed at the sun gear and the second passage is directed at a respective one of the intermediate gears subsequent to the step of inserting the sun gear and the step of moving each of the intermediate gears radially inward.

8. The method as recited in claim 7, wherein the mounts are wedge-shaped.

9. The method as recited in claim 7, wherein the baffles include ends that abut the respective mounts, and the central gear pocket is provided between a surface on each of the baffles opposite the ends.

10. The method as recited in claim 9, wherein the at least one compressor hub is a plurality of compressor hubs with blades driven by a turbine shaft.

11. The method as recited in claim 10, wherein the step of arranging the compressor shaft includes coupling the compressor hubs and the compressor shaft at a common attachment point.

12. The method as recited in claim 10, wherein each of the lubrication passages includes a primary passage that extends laterally between the side walls, the first and second passages extend transversely from the primary passage.

13. The method as recited in claim 12, wherein the first and second passages are arranged ninety degrees from one another.

14. The method as recited in claim 12, wherein the mounts have opposing curved surfaces in close proximity to the intermediate gears and generally follow a curvature of the intermediate gears subsequent to the step of moving each of the intermediate gears radially inward.

15. The method as recited in claim 14, wherein the baffles include opposing curved surfaces arranged in close proximity to the intermediate gears subsequent to the step of inserting the plurality of baffles into the carrier.

16. The method as recited in claim 15, wherein the curved surfaces of the mounts and the curved surfaces of the baffles are contiguous and adjoin one another to provide the intermediate gear pockets subsequent to the step of inserting the plurality of baffles into the carrier.

17. The method as recited in claim 16, wherein the step of securing the torque frame to the mounts includes inserting fingers of the torque frame into respective apertures of the mounts.

18. The method as recited in claim 17, wherein the step of securing the baffles includes securing the baffles to the carrier with fasteners.

19. The method as recited in claim 17, wherein the step of securing the torque frame includes positioning pins through spherical bearings and bushings to secure the fingers of the torque frame to the carrier, and includes retaining the pins to the carrier with fasteners.

20. The method as recited in claim 15, further comprising:
inserting a plurality of tubes through respective holes in one of the side walls and then into respective openings in the baffles to communicate with respective ones of the lubrication passages.

21. The method as recited in claim 20, wherein the primary passage fluidly communicates with a lubricant distributor that is fed oil from a lubricant supply in operation.

22. The method as recited in claim 21, wherein the curved surfaces of the mounts and the curved surfaces of the baffles are contiguous and adjoin one another to provide the intermediate gear pockets subsequent to the step of inserting the plurality of baffles into the carrier.

23. The method as recited in claim 22, wherein the step of securing the torque frame to the mounts includes inserting fingers of the torque frame into respective apertures of the mounts.

24. The method as recited in claim 23, wherein the step of securing the baffles includes securing the baffles to the carrier with fasteners.

25. The method as recited in claim 23, further comprising:
arranging seals to seal the tubes to the respective openings and the lubricant distributor.

26. The method as recited in claim 23, further comprising:
securing a spray bar to the carrier;
wherein a spray bar passage extends through one of the baffles to provide oil such that the spray bar sprays the oil in a vicinity of the sun gear in operation.

27. The method as recited in claim 26, wherein:
the step of connecting the sun gear to the compressor shaft includes connecting the sun gear to the compressor shaft by a splined connection; and
the step of securing the spray bar occurs such that the spray bar sprays the oil in the vicinity of the sun gear near the splined connection in operation.

28. The method as recited in claim 23, wherein the unitary structure is a first material, and the baffles are a second material different than the first material.

29. The method as recited in claim 23, wherein:
the ring gear includes a first ring gear half and a second ring gear half, and flanges extend outwardly from the respective first and second ring gear halves along a radial interface;
the step of securing the ring gear to the turbofan shaft by the connection includes fastening the flanges to the turbofan shaft.

30. The method as recited in claim 29, wherein the unitary structure is a first material, and the baffles are a second material different than the first material.

* * * * *